No. 811,272. PATENTED JAN. 30, 1906.
G. L. BELCHER.
FOUNTAIN BRUSH.
APPLICATION FILED OCT. 26, 1904.
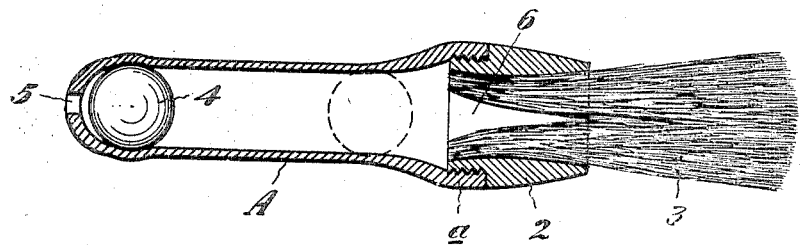
WITNESSES,
Chas. F. Chapin.
INVENTOR,
Gilbert L. Belcher
By Geo. H. Strong atty.

UNITED STATES PATENT OFFICE.

GILBERT L. BELCHER, OF OAKLAND, CALIFORNIA.

FOUNTAIN-BRUSH.

No. 811,272.

Specification of Letters Patent.

Patented Jan. 30, 1906.

Application filed October 26, 1904. Serial No. 230,122.

*To all whom it may concern:*

Be it known that I, GILBERT L. BELCHER, a citizen of the United States, residing at Oakland, in the county of Alameda and State of California, have invented new and useful Improvements in Fountain-Brushes, of which the following is a specification.

My invention relates to fountain-brushes; and it consists of the parts and the constructions and combinations of parts, which I will hereinafter describe and claim.

The figure is a section of my improved brush.

A represents a compressible tubular container which is preferably made of soft or moderately flexible rubber or other similarly elastic substance, with a hard-rubber or inflexible threaded end portion a, adapted to receive the socket 2, carrying the bristles 3, Fig. 1.

A follower 4 of any suitable size, shape, and material is contained in the tubular part A and is movable therein by a simple compression of the tube on one side or the other of the follower.

In practice I have made a container or handle for a brush of a piece of rubber tubing and employed an ordinary marble for a follower.

The follower should be of sufficiently greater diameter than the normal interior bore of the container, so that the follower will have a snug fit therein to prevent the passage of any paste around the follower. The outer end of the handle behind the follower is open or partly open, as shown, leaving a suitable air-vent 5. A suitable preferably tapered passage-way 6 is provided central of the bristles to allow the contents of the handle when compressed by the follower to pass out into the bristles to form a lather.

The bristles may be secured by any of the usual and suitable methods practiced in the art of brush-making.

I prefer to employ a handle of rubber to contain the paste, since rubber possesses that elastic property which allows it to resume its original shape on the release of pressure, and so permit of its being charged and discharged an indefinite number of times.

The inherent elasticity of the handle, aided by the ball or follower and the body of paste, will operate to preserve the natural shape of the handle and always give the operator a good grip on the brush, while the vent 5 allows air to enter behind the follower to enable the elastic walls to spring out and resume their original shape.

When the follower has been pressed to its farthest forward point of movement, the handle can be unscrewed from the socket, the follower pressed back to the end of the handle adjacent to vent 5, the reservoir filled afresh, and the handle again screwed onto the socket ready for further use.

While I have described my invention as more particularly applied to a fountain-brush, it is possible that various modifications in and applications of my invention may be made without departing from the principle thereof, and I do not wish to be understood as limiting myself to the specific construction and application herein shown and described.

Having thus described my invention, what I claim, and desire to secure by Letters Patent, is—

1. A fountain-brush comprising a tubular handle, a socket provided with bristles, and a follower reciprocable in the handle said handle being of compressible material capable of resuming its original tubular form on the release of pressure.

2. A fountain-brush having in combination a tubular handle, a socket connected to the handle and provided with bristles, and a spherical forcing device contained within the chamber of the handle, for supplying the contents of the latter to the bristles, said handle composed of flexible material whereby it is capable of resuming a normal tubular form behind the follower on the release of pressure.

3. A fountain-brush having in combination a hollow handle portion capable of automatically resuming a normal tubular form after compression, a socket having bristles communicating with the chamber of the handle, a spherical forcing device operable in the handle to supply the contents thereof to the bristles, and means for venting the portion of the handle back of the forcing device.

4. A fountain-brush comprising a flexible tubular part, a follower contained in said part and of greater external diameter than the normal interior diameter of the tubular part and a brush connected with the latter.

5. A fountain-brush comprising a handle portion of compressible elastic material, a follower of larger diameter than the normal bore of the handle and a brush secured to said handle and having a central opening communicating with the interior of the handle.

6. A fountain-brush comprising a handle of collapsible material capable of automatic expansion after compression and having a rigid screw-threaded part at one end for the attachment of a brush, a removable brush-socket fitting said screw-threaded part, a brush carried by said socket and having a passage-way communicating with the interior of the handle and a follower reciprocal in the handle and having a diameter greater than the normal interior diameter of the handle.

In testimony whereof I have hereunto set my hand in presence of two subscribing witnesses.

GILBERT L. BELCHER.

Witnesses:
    W. T. HESS,
    C. G. DALL.